July 30, 1968  G. B. KLINEFELTER  3,394,724
DEVICES EMPLOYING FLOAT ACTUATOR VALVES
Filed July 25, 1966
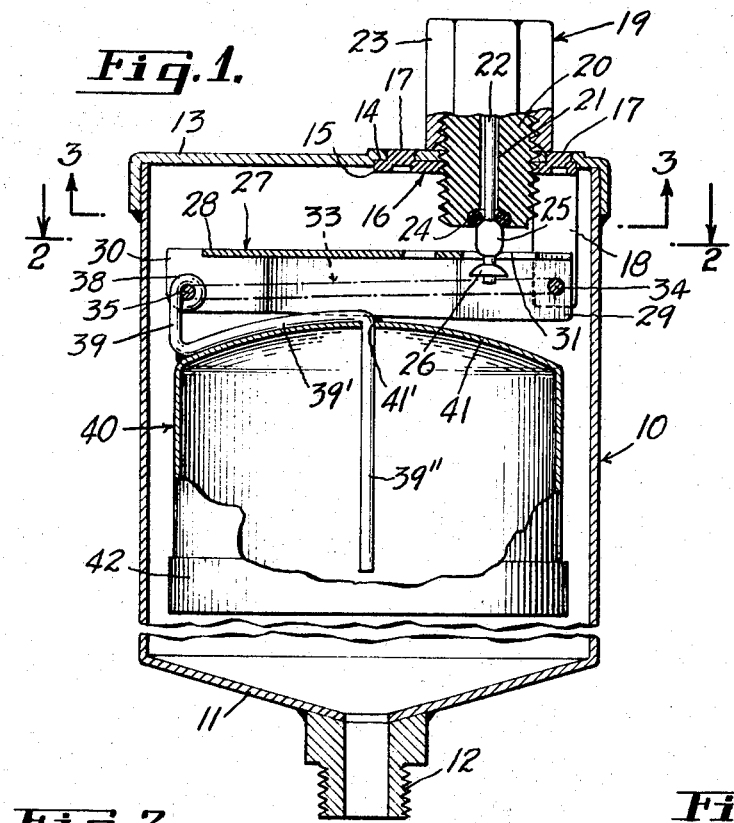
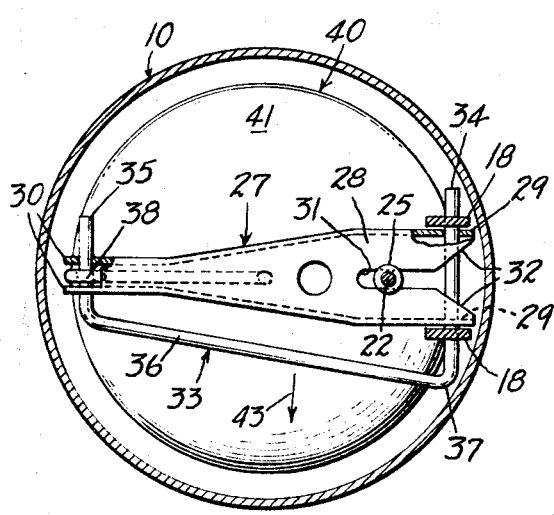
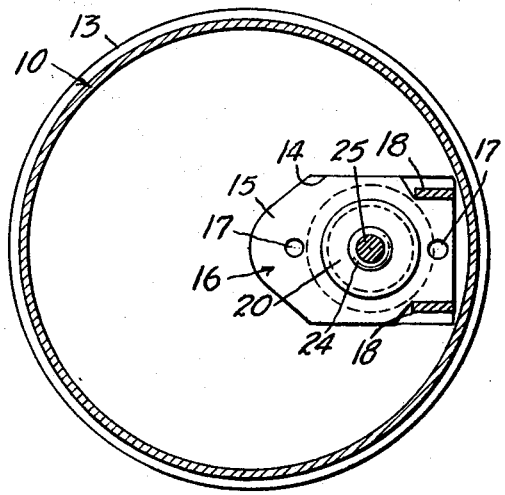
INVENTOR.
GLENN B. KLINEFELTER
BY
ATTORNEY

United States Patent Office 3,394,724
Patented July 30, 1968

3,394,724
DEVICES EMPLOYING FLOAT
ACTUATOR VALVES
Glenn B. Klinefelter, Mountainside, N.J., assignor to Gorton Heating Corporation, Cranford, N.J., a corporation of New York
Filed July 25, 1966, Ser. No. 567,594
10 Claims. (Cl. 137—202)

This invention relates to a float actuated valve, such as employed in air valve devices for radiators. More particularly, the invention deals with what I term a dual free pivot yoke for pivotally supporting the valve actuating lever in the casing of the device, as well as in pivotal support of a float on said lever. Further, the invention deals with an assemblage of the character defined which materially simplifies and economizes on the cost of production of the overall device while, at the same time, insuring accurate functioning of the device for a long period of time. Still more particularly, the float of the assemblage has a simplified pivot which, in the combination defined, further contributes to the economy and practicability of the device.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged sectional view through an air valve device for radiators, with parts of the construction broken away and parts in section, diagrammatically illustrating the valve of the device in closed position.

FIG. 2 is a section, generally along the line 2—2 of FIG. 1, with parts of the construction broken away and in section and omitting part of the background showing; and FIG. 3 is a section generally along the line 3—3 of FIG. 1.

In showing one adaptation and use of my invention, a radiator air valve device is shown. Considering FIG. 1, the casing of the device is shown at 10. The casing has a bottom wall 11 terminating in a threaded nipple 12. The top of the casing is opened and closed by a cover 13 constituting the basic support for the assemblage.

On one side portion of the wall of the cover is an off-set to form on the inner surface of the cover a key socket 14 for positioning a plate 15 of a pivot bracket 16. The plate 15 has rivet portions 17 for securing the pivot bracket 16 to the cover 13. Sides of the bracket 16 have integral parallel pivot bars 18 extending into the casing 10. The bars 18 are located adjacent the wall of the casing 10. Note FIG. 2.

The offset portion of the cover 13, as well as the plate 15, are threaded to receive an air valve 19 which can be generally of the structure of the air valve, as disclosed in Letters Patent No. 3,002,522 issued Oct. 3, 1961.

The valve 19 comprises a plug or threaded sleeve 20, having a bore 21, in which a valve rod or stem 22 is arranged. At 23 is shown a cap or nut for securing the air valve assemblage to the cover 13. An O-ring seat 24 is at the inner end of the bore 21, in connection with which the valve element 25 on the rod 22 seats in sealing the inner end of the bore 21. On the rod 22, spaced with respect to the element 25, is a disc 26.

At 27 is shown a lever, generally of channel cross-sectional form. The lever 27 has a top wall 28 and depending side walls, which are parallel and widely spaced at one end, as seen at 29, and narrowly spaced at the other end, as seen at 30. This structure provides the contracted contour of the top wall 28, as seen in FIG. 2 of the drawing. The top wall 28, at the wide end, has an elongated aperture 31 flared at the end of the lever 27, as seen at 32, this structure facilitating assemblage of the lever with the rod 22 of the air valve, as clearly illustrated in FIG. 1.

At 33, FIG. 2, is shown my improved dual free pivot yoke, having a long pivot pin side 34 and a short pivot pin side 35. These sides are joined in an angular crosshead 36. The crosshead 36 joins the pin 34 in a rounded stop corner 37 arranged in close proximity to the wall of the casing 10, as clearly seen in FIG. 2 of the drawing. The pivot pin side 34 is slidably mounted in apertures in the pivot bars 18 and in the side walls 29 of the lever and, in like manner, the pivot pin side 35 is slidably mounted in the walls 30 of the lever and in a pivot eye 38 of a pivot rod 39 projecting upwardly from one side of a float 40.

The float 40 has a rounded top wall 41 and a bottom cover 42. The rod 39 has a portion 39′ conforming to and soldered to the wall 41. The rod 39 further includes a depending stabilizing portion 39″ arranged and soldered in an aperture 41′ centrally of the top wall 41. Note FIG. 1 of the drawing. The long portion 39″ serves to support the rod 39 in an upright position in the soldering operation.

With the exception of the casing 10, all of the parts are assembled on the cover 13 before the cover is soldered or otherwise fixed to the casing 10. In this assemblage, the bracket 16 is first fixed to the cover, after which, the air valve 19 is attached. Then, the lever 27 is positioned on the valve rod 22, as shown in FIG. 1. Now, the eye 30 of the float is arranged in the position shown in FIGS. 1 and 2 and the wide walls 29 are properly positioned in the bars 18 for alinement of the apertures in 29 and 18 and, then, the yoke 33 is moved into the coupled position, as clearly seen in FIG. 2 of the drawing. This completes the assemblage of all of the parts on the cover 13.

In placing the assemblage in the casing 10, the yoke will assume a position, substantially as seen in FIG. 2, to clear the walls of the casing, after which, the cover will be fixed to the casing.

It will appear from a consideration of FIG. 2 that movement of the yoke 33 in the direction of the arrow 43 is checked by the stop corner 37 engaging the wall of the casing 10, leaving the pivot pin sides 34 and 35 free for sliding movement, without any danger of detachment of the ends of the pivot sides from adjacent side walls 29, 30 of the lever 27.

In the diagrammatic showing of FIG. 1, the lever 27 is shown supported by the float in its fully raised position, seating the valve element 25 on the O-ring. However, as the float 40 lowers in the casing 10, the lever will swing on the pivot pin side 34 in movement of the valve element 25 into open position, thus exposing the lower end of the bore 21 for proper functioning of the air valve 19 employed.

For purposes of description, the bracket 16 and float 20 may be said to comprise spaced members having pivot means, as at 18 and 38, respectively. It will be apparent that the wide spread of the bars 18 of the bracket 16, as well as the wide spread of the side walls 29 serve to maintain the lever 27 against any horizontal swinging movement or any shifting movement of the float 40 in the casing 10.

Having fully described my invention, what I claim as new and desire to secure by Letters Patent is:

1. A float actuated valve assemblage for mounting in the casing of a valve device, said assemblage comprising a cover for mounting on a casing of the device, a pivot bracket fixed to the inner surface of the cover, an air valve mounted on said cover and said bracket, said air valve including a valve rod projecting at the inner surface of said cover adjacent pivot means of said bracket, a float having a pivot projecting therefrom, a valve operating lever coupled with said valve rod, a dual free pivot yoke having pivot pin sides, one pivot pin side being mounted in one end of the lever and the pivot means of said bracket, the other pivot pin side being mounted in the other end of said lever and the pivot of said float in the completion of said assemblage, preparatory to arrangement thereof in said casing, the pivot pin sides being parallel and joined by a crosshead, and the juncture of one of the pivot pin sides with the crosshead forming a stop corner arranged adjacent the casing wall when the assemblage is in the casing in retaining the pivot pin sides of the yoke at all times in coupled engagement with ends of the lever, the pivot means of said bracket and the pivot of the float.

2. An assemblage as defined in claim 1, wherein end portions of said lever have spaced parallel walls in which the pivot pin sides of said yoke are mounted, and the spaced parallel walls at the first named end of the lever being more widely spaced than the walls at the other end of said lever.

3. An assemblage as defined in claim 2, wherein the lever is of channel cross-sectional form and includes a top wall including an aperture opening through one end of the lever for reception of said valve rod.

4. An assemblage as defined in claim 1, wherein said pivot bracket includes a plate mounted in a key socket on the inner surface of said cover, and the pivot means of said bracket comprising a pair of spaced bars arranged at right angles to said bracket plate.

5. An assemblage as defined in claim 1, wherein the pivot of said float comprises a rod fixed to the upper surface of the float, the rod having at one end an upwardly directed part terminating in an eye forming the float pivot, and said rod including a long end portion mounted in an aperture centrally of the top of the float and extending into said float.

6. An assemblage of the character defined, a lever having pivot ends, spaced members having pivot means with which the pivot ends of said lever are adapted to be coupled, a dual free pivot yoke having spaced parallel pivot pin sides, and said pivot pin sides of the yoke being adapted to slidably engage the pivot ends of said lever and the pivot means of said members in free pivotal coupling of said lever with said spaced members.

7. An assemblage as defined in claim 6, wherein the pivot ends of said lever are defined by spaced parallel walls, and the spacing of the walls at one end of the lever being greater than the spacing of the walls at the other end of the lever.

8. An assemblage as defined in claim 7, wherein the pivot means of one member is fixed and the pivot means of the other member is movable with pivotal movement of said lever on said first pivot means.

9. An assemblage as defined in claim 7, wherein one pivot pin side is of greater length than the other pivot pin side.

10. An assemblage as defined in claim 9, wherein the pivot pin sides are parallel and joined in a crosshead, and the juncture of the long pivot side with the crosshead forming a stop corner whereby, in arrangement of the assemblage in a casing, said stop corner is adapted to engage the casing wall in retaining the pivot sides of the yoke at all times in coupled engagement with ends of the lever and the pivot means of said members.

References Cited
UNITED STATES PATENTS 2,276,136   3/1942   Woolley _____ 137—434 X ALAN COHAN, *Primary Examiner.*